United States Patent

Doh

Patent Number: 5,812,327
Date of Patent: Sep. 22, 1998

[54] IMAGING LENS

[75] Inventor: Satoshi Doh, Tsurugashima, Japan

[73] Assignee: Hinode Co., Ltd., Tokyo, Japan

[21] Appl. No.: 790,758

[22] Filed: Jan. 27, 1997

[30] Foreign Application Priority Data

Sep. 27, 1996 [JP] Japan ................................. 8-277387

[51] Int. Cl.$^6$ ........................................................ G02B 9/04
[52] U.S. Cl. ............................................. 359/793; 359/717
[58] Field of Search ................................... 359/793, 717, 359/713–716

[56] References Cited

U.S. PATENT DOCUMENTS 5,475,536  12/1995  Kikutani ................................ 359/793
5,619,380   4/1997  Ogasawara et al. ................... 359/793

FOREIGN PATENT DOCUMENTS 2-71219  3/1990  Japan .

Primary Examiner—Georgia Y. Epps
Assistant Examiner—Jordan M. Schwartz
Attorney, Agent, or Firm—Spencer & Frank

[57] ABSTRACT

An imaging lens provided with a first component lens ($L_1$), which is a negative meniscus lens, whose convex surface has a large curvature and faces an object to be imaged, and with a second component lens ($L_2$) that is a convex lens having a positive power. Moreover, as a whole, the imaging lens employs at least two aspherical surfaces. Thereby, various aberrations are corrected favorably. Further, this enables the effective use of plastic lenses. In addition to the provision of the first and second component lenses, the imaging lens satisfies the following configurational conditions:

$$0.3 < f_2/F < 0.99 \qquad (1)$$

$$8 > F > D_2 \qquad (2)$$

where F designates a focal length of the imaging lens; $f_2$ a focal length of the second component lens ($L_2$); and $D_2$ the distance between the first component lens ($L_1$) and the second component lens ($L_2$). Thus, the imaging lens which has sufficiently high image-brightness (for example, has an f-number of 2 or so) but is composed of a small number of lenses, namely, two lenses and is available as an inexpensive high-performance lens for use in a CCD TV or the like.

5 Claims, 5 Drawing Sheets

EMBODIMENT 1

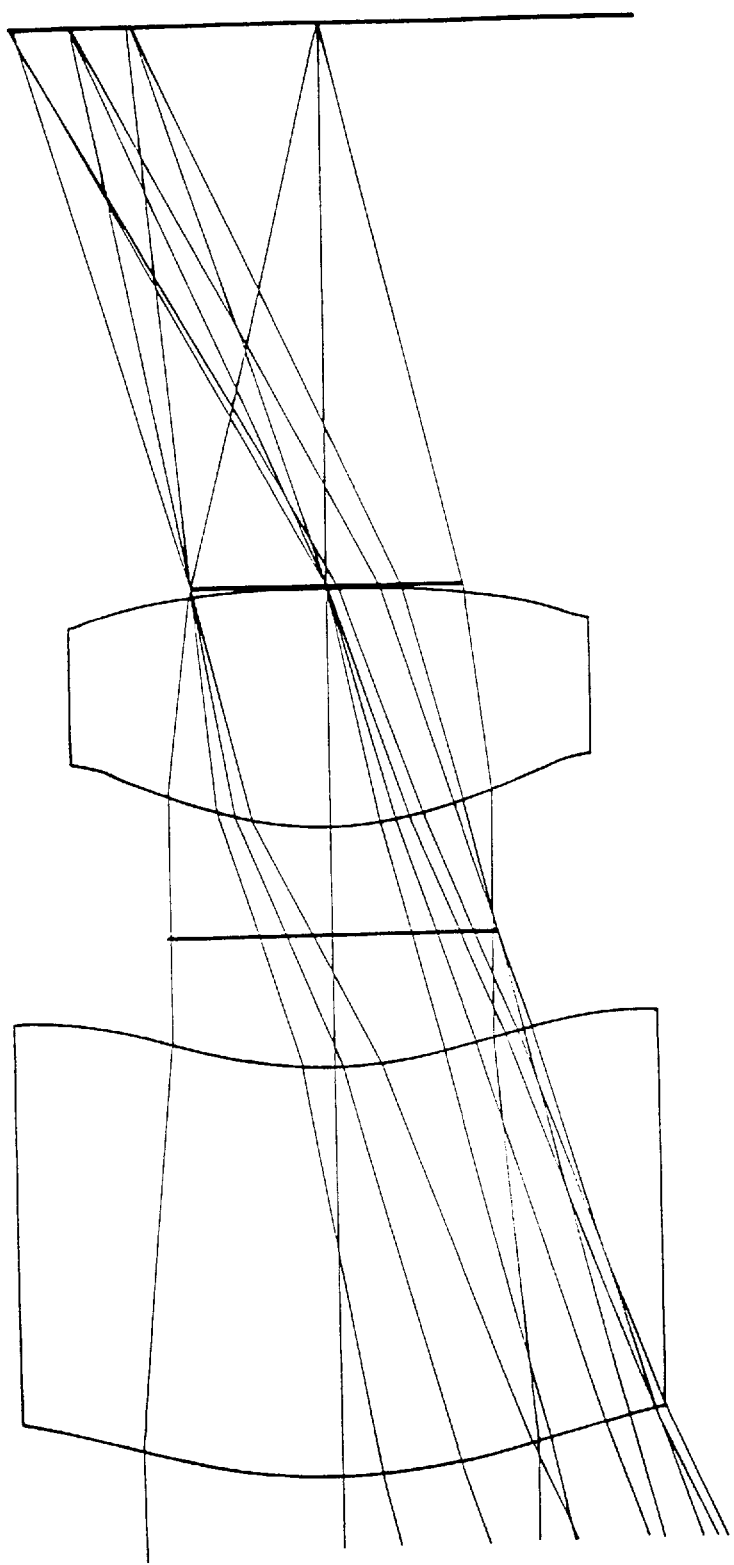

EMBODIMENT 1

EMBODIMENT 2

IMAGING LENS

BACKGROUND OF THE INVENTION

1. Field of the Invention

The present invention relates to a monitoring lens for use in a television (TV) telephone, to reading lenses for use in personal computer communication and for use in the Internet, to a door monitoring lens and to an imaging lens for use in a CCD TV camera.

2. Description of the Related Art

Recently, as such a kind of an imaging (or taking) lens for use in a CCD TV camera, there has been proposed a lens system, the number of lenses of which is particularly reduced with the intention of decreasing the cost and realizing a compact system.

However, although the reduction in the number of lenses is indeed intended, spherical and aspherical glass lenses, whose manufacturability is very low, are included in the system. This results in an increase in the cost of the system. This lens system, therefore, does not sufficiently contribute to the reduction in the cost of the imaging lens.

Further, although another CCD-TV lens system, which positively employs plastic materials that have progressed in accuracy in recent years, has emerged, this lens system does not have sufficient performance. Moreover, under the present conditions, the overall length of the lens (system) is long and the number of the lenses of the system is large.

In the case of the conventional lens systems of such a kind, the number of component (or composing-element) lenses is large. It is, therefore, difficult to realize a lens systems of such a kind at a low cost. Moreover, it is difficult to realize a lens system of such a kind, which has an extremely short focal length while maintaining the optical performance. Furthermore, the entire length of the lens system of such a kind is long, so that the miniaturization of the lens system is difficult.

Various attempts have been made to realize a lens system of such a kind by employing a doublet lens configuration instead of a single (element) lens configuration. However, all of such lens systems have a problem in that the size of the entire lens system is liable to become large.

It is, accordingly, an object of the present invention to provide an imaging lens (system), which has sufficiently high image-brightness (or image-irradiance) (for example, has an f-number (or F-number) of 2 or so) but is composed of a small number of lenses (namely, two lenses) and is available as an inexpensive high-performance lens for use in a CCD TV or the like.

Further, it is another object of the present invention to provide an imaging lens (system), all of the component lenses of which are made of plastic materials, thereby reducing the weight thereof.

SUMMARY OF THE INVENTION

To achieve the foregoing objects, in accordance with the present invention, there is provided an imaging lens (system) that has the following configuration (see FIG. 1).

Namely, the imaging lens (system) of the present invention comprises: a first lens which has a negative power; and a second lens which has a positive power. That is, the imaging lens (system) of the present invention consists of the following two lenses, namely, the first lens ($L_1$) which is a meniscus lens, whose convex surface has a large curvature and faces an object to be imaged; and the second lens ($L_2$) which has a positive power.

Further, the entire lens group (or system) employs at least two aspherical surfaces, in addition to the herein-above-mentioned characteristic features thereof. Thereby, various aberrations are corrected favorably. Moreover, this enables the effective use of plastic lenses.

This imaging lens of the present invention should be provided with the aforementioned geometric features. In addition, this imaging lens of the present invention should satisfy or meet the following configurational conditions:

$$0.3 < f_2/F > 0.99 \tag{1}$$

$$8 > F > D_2 \tag{2}$$

where F designates a focal length of the lens system (namely, the compound or doublet lens); $f_2$ a focal length of the second lens ($L_2$); and $D_2$ the surface separation (or distance) between the first lens ($L_1$) and the second lens ($L_2$) wherein the above parameters are defined throughout in terms of millimeters.

Both of the first and second lenses may be (synthetic) resin lenses.

Additionally, the first and second lenses may be formed so that the second surface of the first lens ($L_1$) is an aspherical surface and that both surfaces of the second lens ($L_2$) are aspherical surfaces.

Aspherical surfaces are employed as two or more surfaces of the lens (system), for example, so as to compose a lens (system), which is used in a CCD TV, from a small number of component lenses, namely, two component lenses and to achieve a compact lens (system), whose image brightness is sufficiently high. Further, the aforesaid conditions (1) determine the power distribution between the component lenses. If the ratio ($f_2/F$) is less than the lower limit, the power of the first lens increases, so that the correction of various optical aberrations becomes difficult. Moreover, if the ratio ($f_2/F$) exceeds the upper limit, the distance between the first and second lenses increases. Thus, the size of the optical system increases. Moreover, the power of the second lens power increases. Consequently, in the case of maintaining the small size of the lens (system), the correction of the various optical aberrations becomes difficult. The condition (2) prescribes the size of the lens system. If the distance $D_2$ is longer than the focal length F, the overall length of the lens (system) increases and moreover, the outside diameter of the first lens increases. Consequently, the size of the entire lens (system) becomes large.

In accordance with the conditions (1) and (2), the distance between the first and second lenses is made to be less than the focal length of the entire lens (system). Consequently, a small-sized imaging lens (system) having excellent characteristics is realized.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 3 is a diagram illustrating optical paths in another imaging lens (system) which is a second embodiment of the present invention;

DETAILED DESCRIPTION OF THE PREFERRED EMBODIMENTS

Hereinafter, the preferred embodiments of the present invention will be described in detail by referring to the accompanying drawings.

Figure 1:
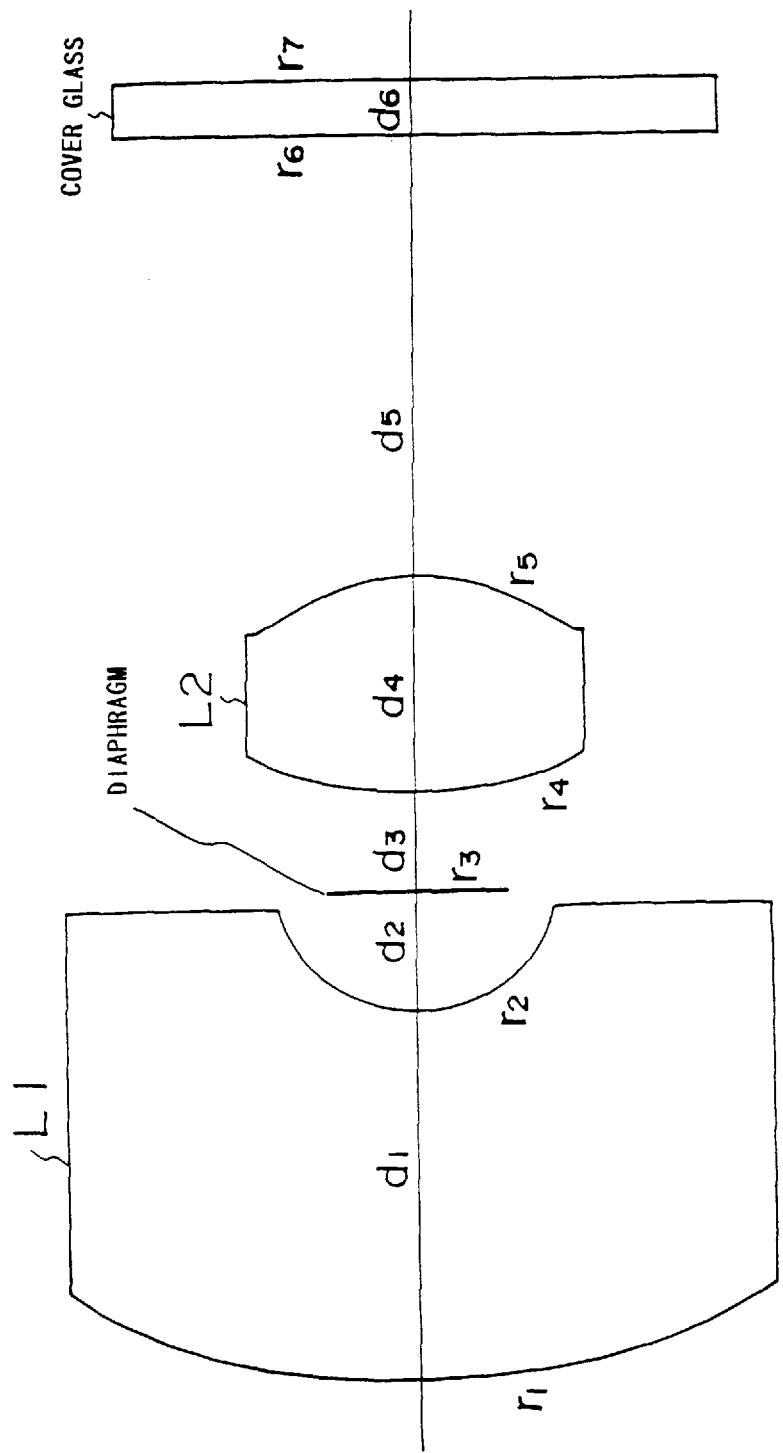
FIG. 1 is a diagram illustrating the configuration of an imaging lens (system) of the present invention.

FIG. 1 is a diagram illustrating the configuration of an imaging lens of the present invention. Further, configuration data (namely, data concerning the configurations) of the first and second embodiment of the present invention are presented in TABLE 1 and TABLE 2, respectively, with all units being in millimeters.

In the case of each of the embodiments of the present invention, a surface number corresponding to a surface of a component lens is a numeral that is assigned to the surface of the component lens so as to designate where this surface is from the nearest surface of the imaging lens to an object to be imaged.

If it is supposed that a suffix "i" denotes such a surface number, in each of the figures and the tables, $r_i$ designates the radius of an i-th surface (in the case of an aspherical surface, the axial radius thereof); $d_i$ the distance between the i-th surface and the (i+1)-th surface; $n_i$ the refractive index of a medium which is present in a region $d_i$; and $v_i$ the dispersion of the medium which is present in the region $d_i$.

Aspherical surface data are presented correspondingly to the surface numbers in the bottom sections of TABLE 1 and TABLE 2.

Surface number 3 corresponds to a diaphragm face. Further, in the case that the radius of curvature is indicated as 0, this means that the radius of curvature is infinity. The

TABLE 1

Configuration Data (Embodiment 1)

| Radius of Curvature ($r_j$) | Distance ($d_j$) | Refractive Index ($n_j$) | Abbe Constant ($v_j$) |
|---|---|---|---|
| $r_1$ = 9.618 | $d_1$ = 3.65 | n = 1.583 | $v_1$ = 30 |
| $r_2$ = 1.656 | $d_2$ = 1.4 | | |
| $1/r_3$ = 0.000 | $d_3$ = 0.8 | | |
| $r_4$ = 4.889 | $d_4$ = 2.15 | $n_4$ = 1.491 | $v_4$ = 57.8 |
| $r_5$ = −2.105 | $d_5$ = 4.4 | | |
| $r_6$ = ∞ | $d_{6 = 0.55}$ | $n_6$ = 1.52 | glass |
| $r_8$ = ∞ | | | |

Paraxial Data

| | |
|---|---|
| Synthetic Focal Length | 3.890 |
| $F_{no}$ (Numerical Aperture) | 2.5 |

Aspherical Coefficients $r_2$ K = 0.27284    A = −0.14602e-1   B = 0.18137e-1   C = −0.50404e-2   D = −0.18991e-2
$r_4$ K = −0.10373e + 2   A = −0.61920e-2   B = 0.38074e-2   C = −0.34704e-3   D = −0.71533e-4
$r_5$ K = −0.43765    A = −0.38381e-4   B = 0.50146e-2   C = −0.16226e-2   D = 0.23966e-3

TABLE 2

Configuration Data (Embodiment 2)

| Radius of Curvature ($r_j$) | Distance ($d_j$) | Refractive Index ($n_j$) | Abbe Constant ($v_j$) |
|---|---|---|---|
| $r_1$ = 5.754 | $d_1$ = 3.6523 | $n_1$ = 1.491 | $v_1$ = 57.8 |
| $r_2$ = 3.786 | $d_2$ = 1.1972 | | |
| $1/r_3$ = 0.0000 | $d_3$ = 1.0000 | | |
| $r_4$ = 3.396 | $d_4$ = 2.157 | $n_4$ = 1.491 | $v_4$ = 57.8 |
| $r_5$ = −10.265 | | | |

Paraxial Data

| | |
|---|---|
| Synthetic Focal Length | 7.408 |
| $F_{no}$ (Numerical Aperture) | 2.1 |

Aspherical Coefficients $r_1$ K = −0.31929e + 1   A = −0.39407e-3   B = −0.14333e-3   C = 0.50607e-5   D = −0.30841e-6
$r_2$ K = −0.5107e + 1    A = −0.17361e-2   B = −0.57085e-3   C = 0.23311e-4   D = 0.22019e-6
$r_4$ K = −0.31098        A = −0.61367e-2   B = −0.14512e-3   C = O.12263e-3   D = −0.37188e-4
$r_5$ K = 0.66661e + 1    A = 0.23442e-2    B = 0.48820e-3    C = −0.31412e-3  D = 0.16740e-4 refractive index is that in the case of using D-line (whose components have the wavelength of 587.56 nm). Moreover, the dispersion is represented in terms of Abbe constant. Furthermore, the aspherical coefficients are coefficients A to H of an equation (to be described later).

In FIGS. 4A–4C and 5A–5C which illustrate aberrations caused in the embodiments of the present invention, SA denotes spherical aberration. Further, reference numeral 1 designates aberration in the case of using D-line (whose components have the wavelength of 587.56 nm); 2 that in the case of using G-line (whose components have the wavelength of 435.84 nm); and 3 aberration in the case of using C-line (whose components have the wavelength of 656.27 nm). Moreover, OSC denotes chromatic or color aberration.

Additionally, AS designates astigmatism; and DIST distortion. The pointed ends of curves respectively representing the astigmatism and the distortion in FIG. 4 are located at a position deviated 3 mm from the center. Further, the pointed ends of curves respectively representing the astigmatism and the distortion in FIG. 5 are located at a position deviated 2.25 mm therefrom.

Aspherical surface of the present invention is given by the following equation:

$$Z = ch^2/[1+\{1-(1+k)c^2h^2\}^{+1/2}] + Ah^4 + Bh^6 + Ch^8 + Dh^{10} + \ldots + Hh^{18} \quad (3)$$

where z a depth from a tangential plane to the aspherical surface at the vertex (or apex) thereof; c a paraxial curvature of the aspherical surface; h a height from the optical axis of the imaging lens; k a cone (or conical) constant; A a fourth-degree (or fourth-order) aspherical coefficient of the fourth-power of h; B a sixth-degree aspherical coefficient of the sixth-power of h; C an eighth-degree aspherical coefficient of the eighth-power of h; D a tenth-degree aspherical coefficient of the tenth-power of h; E a twelfth-degree aspherical coefficient of the twelfth-power of h; F a fourteenth-degree aspherical coefficient of the fourteenth-power of h; G a sixteenth-degree aspherical coefficient of the sixteenth-power of h; and H an eighteenth-degree aspherical coefficient of the eighteenth-power of h.

In the case of the tables listed in the present specification, in the representation of numerical values of the aspherical coefficients, for example, the notation "e−1" designates the minus first-power of 10.

Hereinafter, features of the respective embodiments of the present invention will be described.

Figure 2:
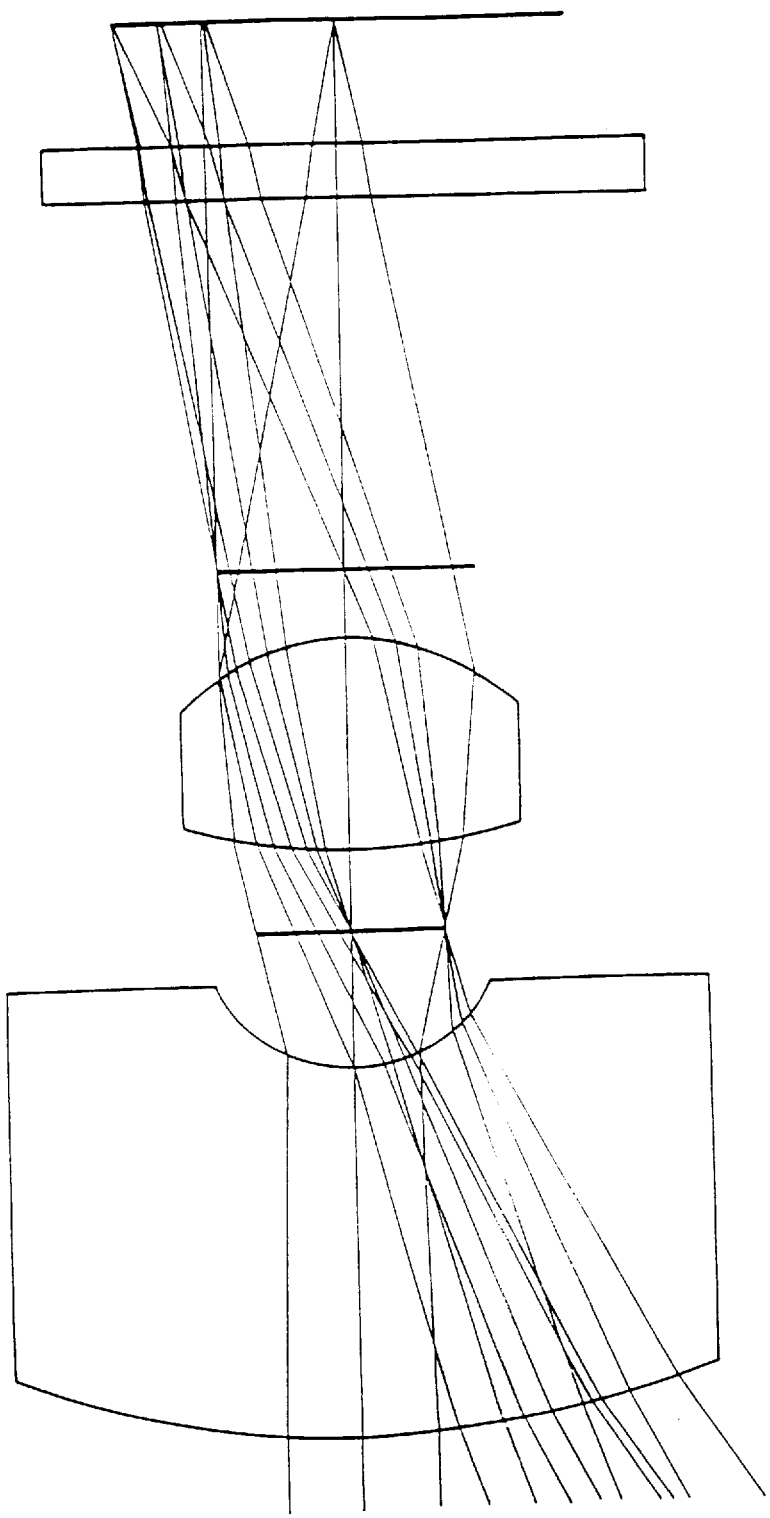
FIG. 2 is a diagram illustrating optical paths in an imaging lens (system) which is a first embodiment of the present invention.
Figure 4A:
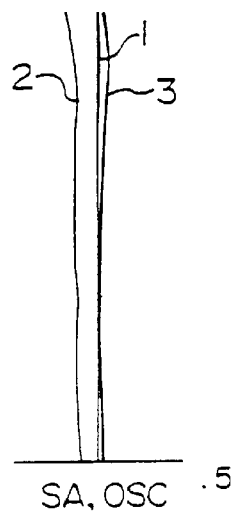
FIGS. 4A–4C are diagrams illustrating aberrations caused in the imaging lens (system) which is the first embodiment of the present invention.
Figure 4B:
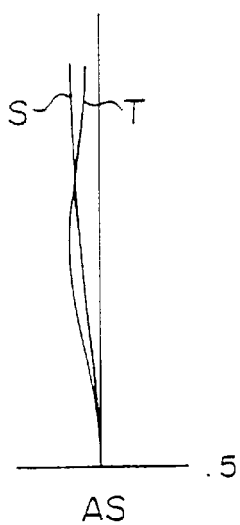
Figure 4C:
Figure 5A:
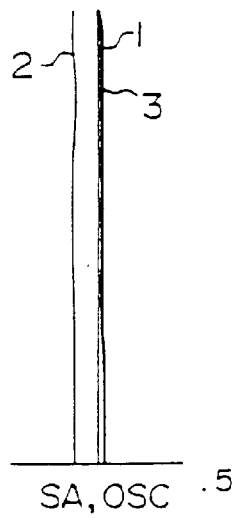
FIGS. 5A–5C are diagrams illustrating aberrations caused in the imaging lens (system) which is the second embodiment of the present invention.
Figure 5B:
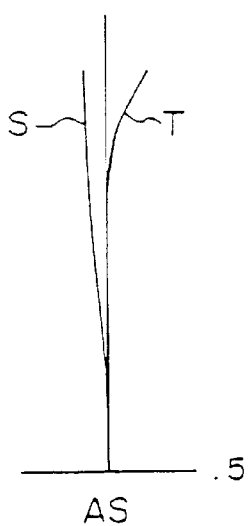
Figure 5C:
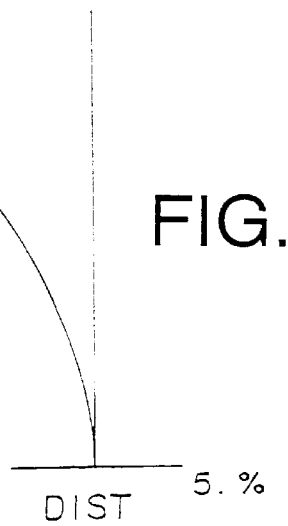

In the case of the imaging lens (system) of FIG. 2, which is the first embodiment of the present invention, the configuration data is set as presented in TABLE 1. Further, a polycarbonate resin (PC) is employed as the material of the first component lens. Moreover, an acrylic resin (PMMA (polymethylmethacrylate)) is employed as the material of the second component lens.

Furthermore, a surface ($r_2$) of the first component lens ($L_1$), and both surfaces of the second component lens ($L_2$) are aspherical surfaces. The focal length $f_1$ of the first component lens, whose material is the (PC) resin, is set as follows: $f_1 = -4.13$. Further, the focal length $f_2$ of the second component lens, whose material is the (PMMA) resin, is set as follows: $f_2 = 3.33$. Moreover, the focal length F of the entire imaging lens is set as follows: F=3.89. Additionally, the distance $D_2$ between the first and second component lenses is set as follows: $D_2 = 2.2$. Thus, the ratio ($f_2/F$)=0.856. Additionally, 8>F (=3.89)>$D_2$ (=2.2).

Next, in the case of the imaging lens (system) of FIG. 3, which is the second embodiment of the present invention, the configuration data is set as presented in TABLE 2.

Further, an acrylic resin (PMMA) is employed as the material of all of the component lenses thereof.

Moreover, both surfaces of the first component lens, as well as both surfaces of the second component lens, are aspherical surfaces. The focal length $f_1$ of the first component lens, whose material is the PMMA resin, is set as follows: $f_1 = -57.95$. Further, the focal length $f_2$ of the second component lens, whose material is the PMMA resin, is set as follows: $f_2 = 5.49$. Moreover, the focal length F of the entire imaging lens is set as follows: F=7.408. Additionally, the distance $D_2$ between the first and second component lenses is set as follows: $D_2 = 2.197$. Thus, the ratio ($f_2/F$)=0.741. Additionally, 8>F (=7.408)>$D_2$ (=2.197).

As above described in detail, each of the two imaging lens groups (or systems) of the present invention comprises only two component lenses. The present invention, however, enables the positive use of plastic lenses and realizes a lens (system) for use in a CCD (TV), which is a small-sized high-performance inexpensive light-weight lens.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. An imaging lens comprising:

first and second component lenses respectively arranged from an object side to an image side thereof, wherein the first component lens ($L_1$) is a negative meniscus lens, having a most object side surface with a large curvature which faces an object to be imaged, and the second component lens ($L_2$) is a biconvex lens having a positive power, wherein at least one surface of the first component lens ($L_1$) is an aspherical surface, and one or more surfaces of the second component lens ($L_2$) are aspherical surfaces, and the imaging lens is a lens system having at least two aspherical surfaces, wherein each of the following conditions is satisfied:

$$0.3 < f_2/F > 0.99 \quad (1)$$

$$8 > F > D_2 \quad (2)$$

where units are in millimeters and F designates a focal length of the imaging lens; $f_2$ a focal length of the second component lens ($L_2$); and $D_2$ a distance between the first component lens ($L_1$) and the second component lens ($L_2$).

2. An imaging lens according to claim 1, wherein both of the first and second component lenses are synthetic resin lenses.

3. An imaging lens according to claim 1, wherein the first and second component lenses are formed so that the most image side surface of the first component lens ($L_1$) is an aspherical surface and that both the most object side and the most image side surfaces of the biconvex second component lens ($L_2$) are aspherical surfaces.

4. An imaging lens according to claim 2, wherein the first component lens is a polycarbonate resin lens and the second component lens is an acrylic resin lens.

5. An imaging lens according to claim 2, wherein both the first and second component lenses are acrylic resin lenses.

* * * * *